(12) United States Patent  
Thoma

(10) Patent No.: US 10,974,786 B2  
(45) Date of Patent: Apr. 13, 2021

(54) BICYCLE FRAME ELEMENT

(71) Applicant: Canyon Bicycles GmbH, Koblenz (DE)

(72) Inventor: Vincenz Thoma, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 232 days.

(21) Appl. No.: 16/177,660

(22) Filed: Nov. 1, 2018

(65) Prior Publication Data

US 2019/0135369 A1 May 9, 2019

(30) Foreign Application Priority Data

Nov. 3, 2017 (DE) .................... 20 2017 005 685.2

(51) Int. Cl.
*B62K 19/10* (2006.01)
*B62K 19/06* (2006.01)
*B62K 19/40* (2006.01)

(52) U.S. Cl.
CPC .............. *B62K 19/40* (2013.01); *B62K 19/06* (2013.01)

(58) Field of Classification Search
CPC ................................ B62K 19/40; B62K 19/06
USPC ............ 280/288.4, 281.1; 224/425, 426, 427
See application file for complete search history.

(56) References Cited

U.S. PATENT DOCUMENTS

| | | | |
|---|---|---|---|
| 5,236,212 A | 8/1993 | Duehring et al. | |
| 7,393,125 B1 * | 7/2008 | Lai | B62K 19/30 |
| | | | 362/473 |
| 9,969,455 B2 * | 5/2018 | Kwag | E04C 3/08 |
| 2010/0090439 A1 * | 4/2010 | White | B62K 19/40 |
| | | | 280/281.1 |
| 2013/0241174 A1 * | 9/2013 | Meyer | B62M 6/40 |
| | | | 280/281.1 |
| 2015/0274233 A1 | 10/2015 | Hamada | |
| 2016/0311494 A1 * | 10/2016 | Schliewert | B62K 19/30 |
| 2016/0355140 A1 * | 12/2016 | Condon | B60R 9/10 |
| 2017/0048445 A1 * | 2/2017 | Li | H04N 5/2257 |
| 2019/0009855 A1 * | 1/2019 | Munkso | B62J 99/00 |
| 2019/0291810 A1 * | 9/2019 | Slaoui | B62M 6/40 |

FOREIGN PATENT DOCUMENTS

| | | | | |
|---|---|---|---|---|
| CN | 2705380 Y | 6/2005 | | |
| CN | 204489069 U | 7/2015 | | |
| CN | 204895726 U | 12/2015 | | |
| DE | 202010010522 U1 | 11/2010 | | |
| DE | 102015010817 A1 * | 2/2017 | ............ | B62K 19/40 |
| JP | 09066876 A | 3/1997 | | |

* cited by examiner

*Primary Examiner* — Tony H Winner
(74) *Attorney, Agent, or Firm* — The Webb Law Firm

(57) ABSTRACT

A bicycle frame element includes a frame tube which is a top tube, a down tube or a saddle tube of a bicycle frame. The frame tube includes a recess for storage of bicycle accessories such as tools, a bicycle pump, a rain coat or the like. The recess has at least one holding element extending across it. In the area of the recess, the frame tube is formed as a profile closed in a circumferential direction so that the recess has merely a slight influence on a stiffness of the frame tube.

13 Claims, 1 Drawing Sheet

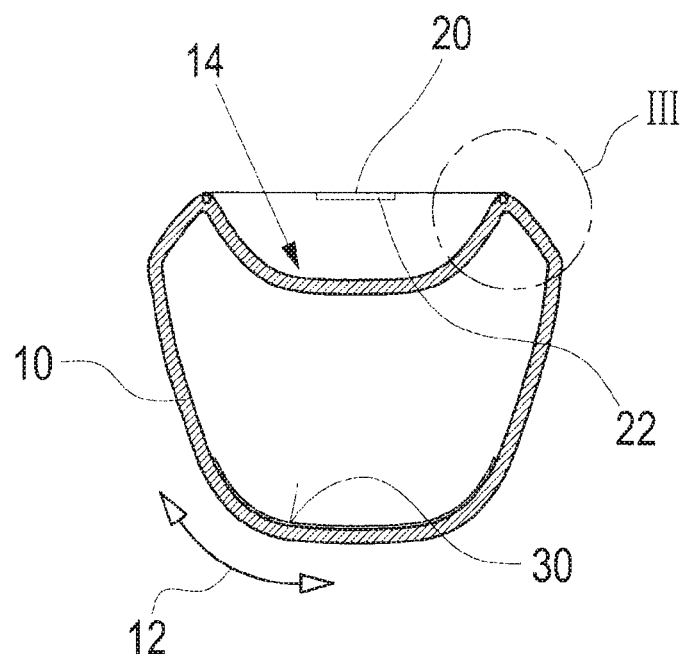
Fig. 1
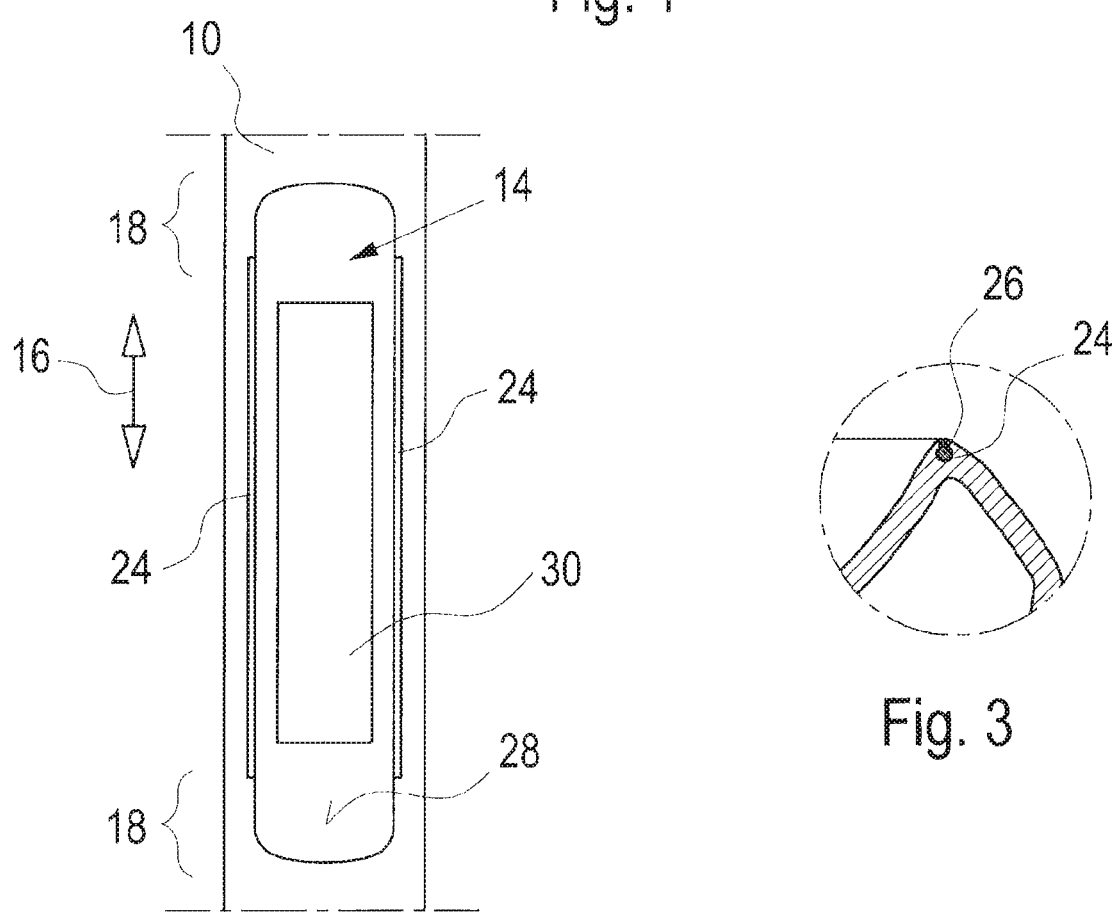
Fig. 2
Fig. 3

BICYCLE FRAME ELEMENT

CROSS-REFERENCE TO RELATED APPLICATION

This application claims priority to German Utility Model Application No. 20 2017 005 685.2 filed Nov. 3, 2017, the disclosure of which is hereby incorporated in its entirety by reference.

BACKGROUND OF THE INVENTION

Field of the Invention

The present invention relates to a bicycle frame element including a frame tube such as e.g. a top tube, a down tube or a saddle tube.

Description of Related Art

For carrying along accessories such as e.g. tools, spare parts, rain jackets etc. during cycling, various receptacles and the like are known. In bicycles such as mountain bikes, racing bicycles and the like which usually are not provided with a bike rack, it is known e.g. to use bags that can be attached on the underside of the saddle. These, however, merely have a limited volume. Further, it is known to fasten similar bags to the top tube, e.g. with the aid of hook- and loop-type fastening bands or the like. Such bags, however, are often disturbing because, in this area, there are frequently arranged bottle holders. Further still, it is known to provide openings in frame tubes so that the hollow interior of a frame tube can be used as a storage space. This, however, causes the considerable disadvantage of weakening the stability of the frame tube. Therefore, it is required to reinforce the frame tube in the area of the opening so as to ensure sufficient stability. A further disadvantage of storing e.g. tools in such openings or recesses of frame tubes resides in the possible clattering sound caused by the tools and other accessories during cycling, since the accessories are not fixed in such recesses.

SUMMARY OF THE INVENTION

It is an object of the invention to provide a bicycle frame element that is particularly suited for storage of accessories in a simple manner.

The bicycle frame element of the invention includes a frame tube such as particularly a top tube, a down tube or a saddle tube of a bicycle frame. Thus, according to a preferred embodiment, the bicycle frame element is a component of the bicycle frame. According to the invention, the frame element includes a recess. The recess serves for storage of bicycle accessories such as e.g. bicycle tools, a bicycle pump, a raincoat, pieces of clothing and the like. The frame tube is preferably made of a plastic tube, particularly of fiber-reinforced plastic such as e.g. carbon. In the area of the recess, the frame tube is formed as profile that is closed in circumferential direction. Thus, particularly, the frame tube is formed as a closed profile not only in the area where no recess is provided but also in the area of the recess. By such a design of the frame tube, it is possible, on the one hand, to design a recess in which bicycle accessories can be stored, while, on the other hand, it is not required to specially reinforce the frame tube in this area since the frame tube does not include an opening that would weaken its stability. Due to the recess in the circumferentially closed profile of the frame tube, the recess causes only a slight change of the stability of the frame tube in this area. This change of stability is possibly caused by the change of the profile. However, since this is merely a slight change of stability, it can either be neglected or be compensated for by minor reinforcement measures, such as e.g. by reinforcement ribs, thickened portions in the material and the like.

According to a particularly preferred embodiment, the frame tube of the bicycle frame element of the invention is without an opening also in the area of the recess. Further, there is provided at least on holding element extending across the recess. The holding element can include e.g. one or a plurality of holding belts, a membrane, a net or the like. Particularly, the holding element is provided for fixing and respectively holding the bicycle accessories arranged in the recess.

The recess preferably has a concave shape. Further, it is preferred that the recess extends in the longitudinal direction of the frame tube. The recess herein has a length of at least 10 cm, preferably at least 15 cm and with particular preference at least 20 cm. As a result of the length, it will thus also be possible to arranged or store also a bicycle pump in the recess. Relative to the conventional surface of the frame tube, i.e. the surface areas where no recess is provided, the recess has a depth of preferably 1-3 cm.

Further, it is preferred that the holding element is least partially elastic. Thereby, also bicycle accessories having a larger volume than the recess itself can be arranged in the recess in a simple manner.

According to a preferred embodiment of the invention, the holding element includes at least one storage pocket. This storage pocket is particularly suited for small parts. Thereby, particularly, it is ensured that such small parts will not slide out of position or clatter in the recess. Further, by selecting a corresponding material of a holding element, there can be formed a water-tight storage pocket. The latter is useful for storage of food or the like.

Further, it is preferred that the connection of the holding element to the frame tube is releasable. This will be of advantage e.g. when cleaning the bicycle because, by this feature, also the recess can be cleaned in the process in a simple manner. Herein, the connection between the at least one holding element and the frame tube can be realized by fastener buttons, eyelets, screw joints or the like. Further possibilities reside in a connection via a kind of zipper or via a longitudinal groove provided in the frame and adapted to receive a thickened portion of the holding element. Also locking connections and the like are suitable as releasable connections.

Further, to allow for simplest possible accessibility also during cycling, it is advantageous if the recess is open in upward direction. In case of a recess provided e.g. in the top tube, the recess is facing in upward direction and thus is accessible in a very simple manner. This is the case in a corresponding manner also for a recess in the down tube, wherein a recess in the down tube is advantageous in as far as the down tube normally has a larger volume so that a larger recess can be provided. If a recess is provided in the saddle tube, it is preferably open toward the front, i.e. in the direction of travel. According to a preferred embodiment, a surface of the recess is preferably coated. This coating is realized as a rubber lining or the like for guaranteeing a reliable hold of the accessories in the recess and for reducing the risk that the accessories might slide out of position or fall out.

Further, it is possible to provide the surface of the recess with fixing elements or abutment elements, thus e.g. lending a partitioned structure to the bin formed by the recess. Further, it is possible to install additional take-up elements such as e.g. belts, pockets and the like for storage of small parts.

The invention will be explained in greater detail hereunder by way of a preferred embodiment and with reference to the accompanying drawings.

BRIEF DESCRIPTION OF THE DRAWINGS

In the drawings, the following is shown:
FIG. 1 is a cross-sectional view of bicycle frame element according to the invention,
FIG. 2 is a top plan view of the bicycle frame element depicted in FIG. 1, and
FIG. 3 is an enlarged view of the area III identified in FIG. 1.

DESCRIPTION OF THE INVENTION

The bicycle frame element of the invention includes a frame tube 10 which can be e.g. a top tube, a down tube or a saddle tube of the bicycle frame. When viewed in cross section (FIG. 1), the frame tube 10 is closed in circumferential direction 12. This profile of the bicycle frame, closed in circumferential direction 12, includes a recess 14 which is hollowed inwardly and particularly has a concave shape. The recess 14 particularly serves for storage of bicycle accessories such as e.g. tools, a bicycle pump, a rain jacket etc. Recess 14 extends in the longitudinal direction 16 of frame tube 10. Also the transitional areas 18 in the longitudinal direction 16 where the transition between recess 14 and the conventionally designed frame tube 10 occurs, is designed without openings provided in frame tube 10. Further, all transitions between recess 14 and frame tube 10 are, as far as possible, free of steps and are preferably formed with correspondingly large radii. This is of advantage particularly when using fiber-reinforced plastic material such as e.g. carbon for producing the frame tube.

Recess 14 is provided with at least one holding element 20 extending across it. In this respect, there can be provided e.g. a plurality of belt-shaped holding elements which in FIG. 2 extend from left to right, wherein, to allow for a better survey, no holding elements are shown in FIG. 2. It is also possible to provide a holding element 20 which covers the entire recess 14 and thus closes the latter. The holding element is preferably made of an at least partially elastic material and particularly is formed as membrane or a net. Particularly on an inner side of a holding element 20, one or a plurality of pockets can be provided for taking up small parts or the like.

The at least one take-up element is preferably connected to frame tube 10 in a releasable manner. In the illustrated exemplary embodiment, frame tube 10 includes two grooves 24 extending in longitudinal direction 16. Into these mutually opposite and mutually parallel grooves, thickened portions 26 provided in the edge region of holding element 20 can be inserted.

On a surface 28 of recess 14, a coating 30 can be provided. This coating can extend across the entire surface 28 or a part of surface 28 and particularly has the purpose that the bicycle accessories arranged in the recess will be kept from sliding or shifting out of position.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A bicycle frame element comprising:
a frame tube comprising a recess for storage of bicycle accessories, and
at least one holding element extending across the recess,
wherein, in an area of the recess, the frame tube is formed as a profile closed in a circumferential direction, and
wherein, on a surface of the recess, the frame tube is at least partially coated.

2. The bicycle frame element according to claim 1, wherein the recess has a concave shape.

3. The bicycle frame element according to claim 1, wherein the recess extends in a longitudinal direction of the frame tube.

4. The bicycle frame element according to claim 3, wherein the recess has a length of at least 10 cm.

5. The bicycle frame element according to claim 1, wherein the holding element is at least partially elastic.

6. The bicycle frame element according to claim 1, wherein the holding element is formed as a holding belt.

7. The bicycle frame element according to claim 1, wherein the holding element is at least partially formed as a membrane or a net.

8. The bicycle frame element according to claim 1, wherein the holding element comprises at least one storage pocket provided for storage of small parts.

9. The bicycle frame element according to claim 1, wherein the holding element is connected to the frame tube in a releasable manner.

10. The bicycle frame element according to claim 1, wherein the recess is open in an upward direction.

11. The bicycle frame element according to claim 1, wherein, on the surface of the recess, the frame tube is provided with fixing elements.

12. The bicycle frame element according to claim 1, wherein, on the surface of the recess, the frame tube is at least partially coated with a rubber lining for holding the bicycle accessories in a position in the recess.

13. The bicycle frame element according to claim 1, wherein, on the surface of the recess, the frame tube is at least partially coated with a coating configured to reduce a risk of the bicycle accessories sliding out of a position in the recess.

* * * * *